United States Patent [19]

Hajdukiewicz et al.

[11] Patent Number: 4,934,065

[45] Date of Patent: * Jun. 19, 1990

[54] PROBE FOR MEASURING WORKPIECES

[75] Inventors: Peter Hajdukiewicz, Wotton-under-Edge; Clifford W. Archer, Dursley, both of United Kingdom

[73] Assignee: Renishaw plc, United Kingdom

[*] Notice: The portion of the term of this patent subsequent to Mar. 21, 2006 has been disclaimed.

[21] Appl. No.: 295,732

[22] Filed: Jan. 11, 1989

Related U.S. Application Data

[63] Continuation of Ser. No. 36,463, Apr. 9, 1987, Pat. No. 4,813,151.

[30] Foreign Application Priority Data

Apr. 24, 1986 [GB] United Kingdom ............... 8610087

[51] Int. Cl.$^5$ .............................................. G01B 3/22
[52] U.S. Cl. ........................................ 33/832; 33/561
[58] Field of Search ............... 33/832, 556, 557, 558, 33/559, 560, 561, DIG. 13; 340/678, 680

[56] References Cited

U.S. PATENT DOCUMENTS

| | | | |
|---|---|---|---|
| 4,339,714 | 7/1982 | Ellis | 324/207 |
| 4,443,946 | 4/1984 | McMurtry | 33/561 |
| 4,451,988 | 6/1984 | McMurtry | 33/561 |
| 4,462,162 | 7/1984 | McMurtry | 33/561 |
| 4,578,873 | 4/1986 | Klingler et al. | 33/832 |
| 4,625,417 | 12/1986 | Cusack | 33/561 |
| 4,813,151 | 3/1989 | Hajdukiewicz et al. | 33/561 |

FOREIGN PATENT DOCUMENTS

| | | |
|---|---|---|
| 2535249 | 2/1977 | Fed. Rep. of Germany . |
| 3210711 | 2/1984 | Fed. Rep. of Germany . |
| 2573865 | 5/1986 | France . |
| 85/04706 | 10/1985 | PCT Int'l Appl. . |

OTHER PUBLICATIONS

Patent Abstract, vol. 9, No. 199 (p-380)[1922] 8/16/85.

Primary Examiner—William A. Cuchlinski, Jr.
Assistant Examiner—Patrick R. Scanlon
Attorney, Agent, or Firm—Oliff & Berridge

[57] ABSTRACT

A contact-sensing probe for measuring workpieces includes a body (16) for attachment to a machine and a workpiece contacting stylus (22) carried by a stylus holder (24) which is mounted within the body for movmeent relative thereto from a rest position to a displaced position when the stylus contacts the workpiece. Sensors are provided for sensing workpiece contact by the stylus. The sensors comprise a plurality of strain gauges (46) mounted on pillars (44) connecting two parts (36A,36B) of a support structure which supports the stylus holder on the body. The strain gauges are mounted with their principal axes lying at an angle to the axes of the pillars, and by optimizing the numbers, positions and dimensions of the pillars together with the angles of the strain gauges, high sensitivity can be achieved with minimum risk of false signals due to probe vibration, while at the same time minimizing the variation in pre-travel of the stylus.

4 Claims, 4 Drawing Sheets

PROBE FOR MEASURING WORKPIECES

This is a continuation of application Ser. No. 07/036,463 filed Apr. 9, 1987 and now U.S. Pat. No. 4,813,151.

This invention relates to a probe for measuring the dimensions of workpieces.

It is known to measure the dimensions of workpieces in co-ordinate measuring machines or machine tools by providing measuring apparatus including a measuring probe for determining the co-ordinate position of the probe relative to the workpiece. The apparatus is operated to move the probe towards a surface of the workpiece whose co-ordinate position is to be measured and the probe is adapted to output a sensing signal responsive to a stylus, forming part of the probe, engaging the surface. In so-called "trigger probes" the probe sensing signal is a step signal produced responsive to engagement between the stylus and the surface, and the position of the surface is measured in terms of the reading of the measuring devices of the machine at an instant following said engagement. The step signal is produced as a result of the stylus, which forms part of an electric circuit of the probe, being displaced from a rest position which causes a change of state of the circuit.

In known trigger probes there is a difficulty in accurately relating the instant at which the stylus engages the workpiece to the instant at which the step signal is received by the machine. The unavoidable displacement of the stylus between these two events (the "pre-travel" of the stylus) is not always uniform for all conditions of operation. In particular, the pre-travel may be different for different directions of displacement of the stylus relative to the base. Since the measurement by the measuring devices of the machine is carried out while the probe is in motion, then, for a given speed of that motion, any variation in pre-travel results in a variation in the measurement.

In our European Patent Specification No. 0068899 an attempt was made to deal separately with the displacement of the stylus which is required for producing the probe sensing signal, and the displacement (or "overtravel" of the stylus) required to prevent damage to the probe or the machine before the machine can be stopped after the sensing signal has been generated. In this Patent specification there is disclosed a sensing system comprising strain-sensitive elements disposed at three locations around the axis of the stylus, between an intermediate member and the body of the probe. The strain-sensitive elements are used to provide an early indication of movement of the intermediate member relative to the base before the stylus which is also mounted on the intermediate member, is displaced from its rest position.

Although this arrangement reduces the amount of pre-travel of the stylus there are still variations in pre-travel depending on the different directions of displacement of the stylus by the workpiece, particularly when using styli which make contact with the workpiece at a point offset from the axis of the probe.

Another attempt to provide greater accuracy of measurement using a probe is disclosed in our published International Patent Specification No. WO 85/04706. In this specification there is described the concept of using displacement sensors connected to the stylus and generating a single sensing signal for communicating with a machine only when the combined signal level from the sensors has reached a pre-determined threshold level indicating a pre-determined displacement of the stylus. Then by suitable programming of the machine computer, the known displacement can be taken into account and the machine is arranged to indicate the position of the probe prior to such displacement i.e. the position of first contact with the workpiece.

There are however, some limitations on this system in that it is only viable with a stylus which is in line with the axis of the probe. Also with the type of transducer shown, the probe is relatively expensive, requires a new calibration for a stylus of different length, and has only limited overtravel protection.

It is an object of the present invention to provide a probe for measuring workpieces which reduces variations in stylus pre-travel which have occurred with previous probe systems.

It is another object of the invention to provide a probe which allows the actual pre-travel to remain at an acceptably high value to provide high immunity to false triggering from external vibration or acceleration of the machine. It is a further object of the invention to provide a probe which operates in six mutually perpendicular directions and achieves the first two objects specified above in all six directions.

The invention as claimed reduces the variation in pre-travel in a probe by providing support structure for supporting the probe stylus on the probe body and which comprises two portions interconnected at positions equally spaced around the probe axis by pillars each of which has a longitudinal axis which is parallel to the axis of the probe. One portion of the structure is connected to the probe body and the stylus is supported on the other portion. Elongate strain sensitive elements are mounted on each of the pillars with their axes inclined to the longitudinal axes of the pillars.

The advantage of this invention is that the dimensions and positions of the pillars, and the positions and orientations of the strain sensitive elements in relation to the pillars, can be optimised to produce not only the required pre-travel of the stylus for immunity to false triggering, but one which has a very small variation regardless of the direction of displacement of the stylus, even with styli having axes inclined to, or offset from, the axis of the probe.

One example of the invention will now be described in detail with reference to the accompanying drawings in which.

Figure 1:
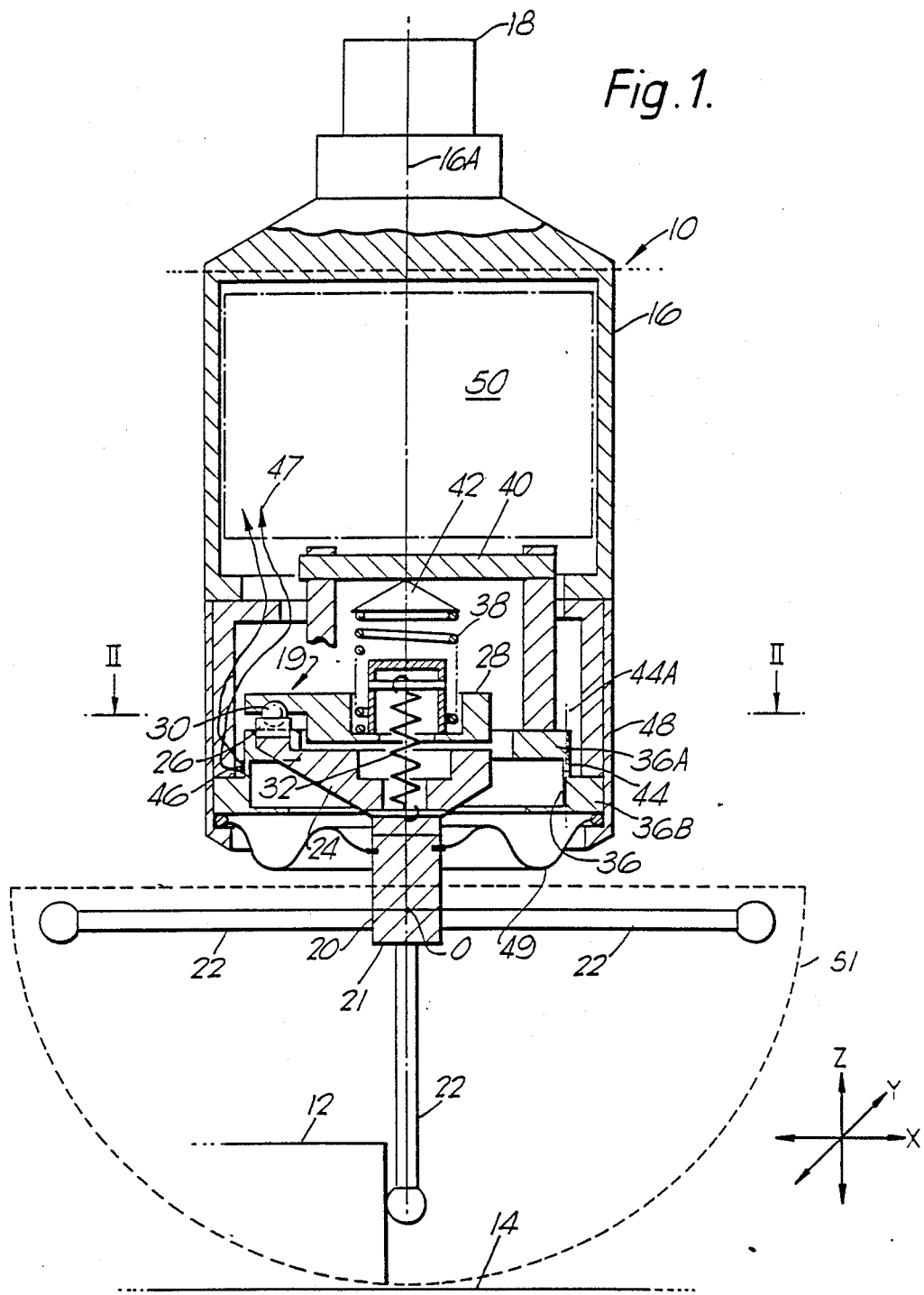
FIG. 1 is a sectional elevation through a probe according to the present invention.
Figure 2:
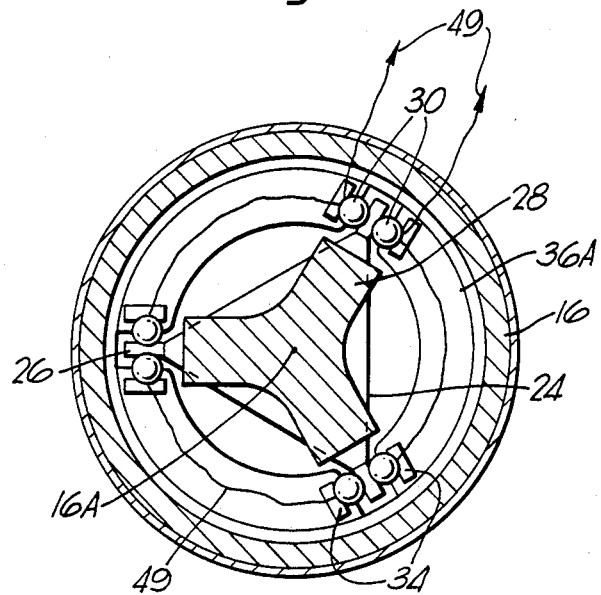
FIG. 2 is a plan view on the line II—II of FIG. 1 showing the manner in which the moveable parts of the probe are supported.
Figure 3:
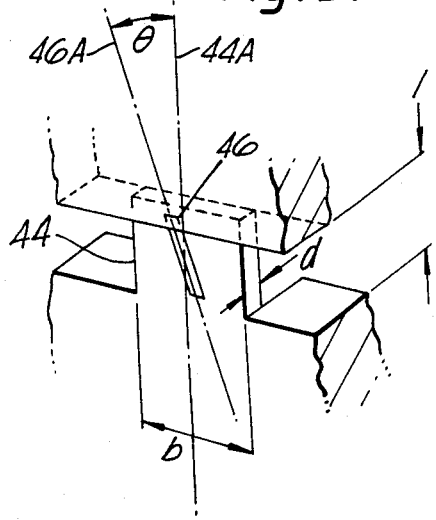
FIG. 3 is an enlarged detailed illustration of one of the strain-sensitive elements of the present invention on its associated pillar.

Referring now to FIGS. 1 to 3 there is shown a measuring probe 10 which is intended to be supported by movable slides of a measuring machine or machine tool (not shown in detail) for movement relative to a workpiece 12 positioned on the base 14 of the machine. The machine slide movement brings the probe into engagement with a surface of the workpiece 12 for sensing the position thereof, and on engagement with said surface the probe sends a signal to the machine which then determines the co-ordinates of the position of the probe in space by recording the positions of the slides of the machine using position counters provided on the machine.

The probe has a body 16 which has a shank 18 for connection to the machine. The body can thus be regarded as comprising fixed structure of the probe. The body has an axis 16A.

Supported within the body 16 is a movable structure, indicated generally by reference numeral 19, which includes a stylus holder 20 to which a stylus cluster 21 is connected. The stylus cluster in this example has five styli 22 extending in mutually perpendicular directions from the centre of the cluster. The five styli enable contact to be made between the probe and various surfaces of a workpiece by machine movement in any of six mutually perpendicular directions.

The stylus holder 20 incorporates a triangular centre plate 24 (FIG. 2) centred on the axis 16A and having three seat elements 26 disposed one at each of its apices in the form of rollers which extend radially of the axis 16A. The plate 24 is supported in a rest position on an intermediate member 28 by means of pairs of seat elements 30 carried by the intermediate member 28 which engage the rollers 26 and form therewith a kinematic support for the plate 24 on the intermediate member 28. A spring 32 in tension urges the plate 24 into the rest position on the seat elements 30 which ensures a positive location of the stylus holder. The stylus holder can however be tiltably or axially downwardly displaced against the spring force from the rest position when any one of the styli 22 engages the workpiece.

The intermediate member 28, which also forms a part of the movable structure 19, comprises a triangular plate which is supported on the probe body 16 by a kinematic support which comprises the spherical seat elements 30 on the intermediate member and three pairs of seat elements 34 in the form of radially extending rollers 34 on an annular roller plate 36A. The seat elements 30 are urged downwardly into engagement with the rollers 34 by a spring 38 to define a positive location for the intermediate member on the plate 36A from which it can be tiltably or axially displaced against the spring force when any one of the styli 22 engages the workpiece. In this example the spring 38 is located by a conical spring support 42 which in turn reacts on a triangular fixed structure 40, connected to the plate 36A by pillar-like support members (not labelled), the arrangement being such that the spring 38 is normally in compression. Plate 36A is the sole means of support for the intermediate member 28.

The plate 36A forms one portion of an annular fixed structure 36 of which a second portion 36B is connected at its radially outer periphery to the probe body 16.

The two portions 36A and 36B of the structure 36 are interconnected by at least three circumferentially spaced pillars 44. The pillars 44 form a region of relative weakness in the load path between the stylus holder and the probe body so that they form the areas of greatest strain in that load path when a force is applied to the stylus. The pillars have an axis 44A which is parallel to the axis 16A of the probe body.

Portion 36B and pillars 44 may be considered means for connecting a fixed structure comprised of portion 36A, the unlabelled pillar-like support members and triangular fixed structure 40 to the body 16.

Sensing devices 46, in the form of elongate semi-conductor strain gauges are provided, one on each pillar, and each strain gauge is positioned with its longitudinal axis 46A inclined at an angle $\theta$ to the axis 44A of the pillar. By this means any one of the strain gauges will provide a signal when any strain is put into the pillars whether the strain is tensile, compressive or torsional, or any combination thereof.

The dimensions d, b, and l of the pillars and their numbers and positions around the structure 36, together with the inclinations of the strain gauge axes are optimised to provide, the highest sensitivity compatible with the conflicting needs of avoiding false triggering due to machine vibrations and accelerations, and of providing the smallest variation in pre-travel under all directions of application of force to any one of the styli 22.

In one practical probe construction three pillars each 0.5 mm long were equally spaced around the structure 36 and to each pillar was attached a semi-conductor strain gauge, the longitudinal axis of which was inclined at 25 degrees to the axis of its respective pillar. With this probe it was possible to achieve a trigger signal from the stylus after a movement of two microns, plus or minus 0.5 microns, in any direction of application of force to the end of any one of the styli 22, regardless of whether the stylus involved was positioned horizontally or vertically, or in any other position within a hemispherical envelope, indicated at 51, centred at 0. The lower part of the probe body 16 was surrounded by a sleeve 48 and sealed with a rubber seal 49 for protection against damage and ingree of dirt.

By using sensitive strain gauges and short pillars, the relative stiffness of the structure 36 is high which produces the high immunity to false triggering and provides for negligible mechanical hysteresis in the system.

In operation, the probe is driven by the machine towards a surface of the workpiece 12. Using a cluster stylus having five orthogonal styli 22, measurements can be made in any one of six orthogonal directions. Because the supports for the stylus holder on the intermediate member and for the intermediate member on the structure 36 are kinematic supports, the whole of the movable structure and the structure 40 can be regarded as a single solid structure until such time as the forces of the springs are overcome by the displacing force on the stylus when it makes contact with the surface of the workpiece.

Thus on an initial contact with the workpiece, any deflection of the stylus results in a strain being put on the single solid structure, which is greatest at the pillars, and is sensed by the strain gauges 46. Signals from the strain gauges are passed by wires 47 to an electrical circuit 50 within the probe body, in which the changing resistance of the strain gauges is sensed. The electrical circuit 50 produces a trigger signal which is passed to a second electrical circuit of the apparatus external to the probe (which in this example is in the interface unit IF FIG. 5) where the signal is processed before being passed to the measuring devices of the machine, to read the instantaneous position of the probe, and to stop the machine. Since the machine cannot be stopped instantaneously its continued movement causes further deflection of the stylus until the force of one or other of the springs is overcome, and the stylus holder, or the intermediate member lifts off its respective kinematic support. This provides adequate braking movement of the machine in all six directions before any damage to the probe results.

As an optional fail-safe arrangement, displacement of the stylus from its rest position may be additionally sensed by an electric circuit 49 which serially connects all of the spherical elements 30 thus providing switch contacts which are completed by the seat elements 26, 34 in the rest position. Thus, any displacement of the stylus causing lifting of any of the seat elements from its respective contacts breaks the circuit. The circuit is connected to the electronic circuit 50 which senses this change of state.

Although the above-described probe has a stylus capable of movement in six directions along the orthoganal axes $\pm x, \pm y$ and $\pm z$, it will be understood that the invention could also be applied to a probe having a stylus capable of movements only in five directions, i.e. one in which the stylus cannot move in the vertically downward direction (the $-z$ direction).

Also it will be understood that the locations and relative dispositions of the seat elements on the static and movable structures may be varied to provide alternative arrangements of the kinematic supports without departing from the basic principle of the invention.

Figure 4:
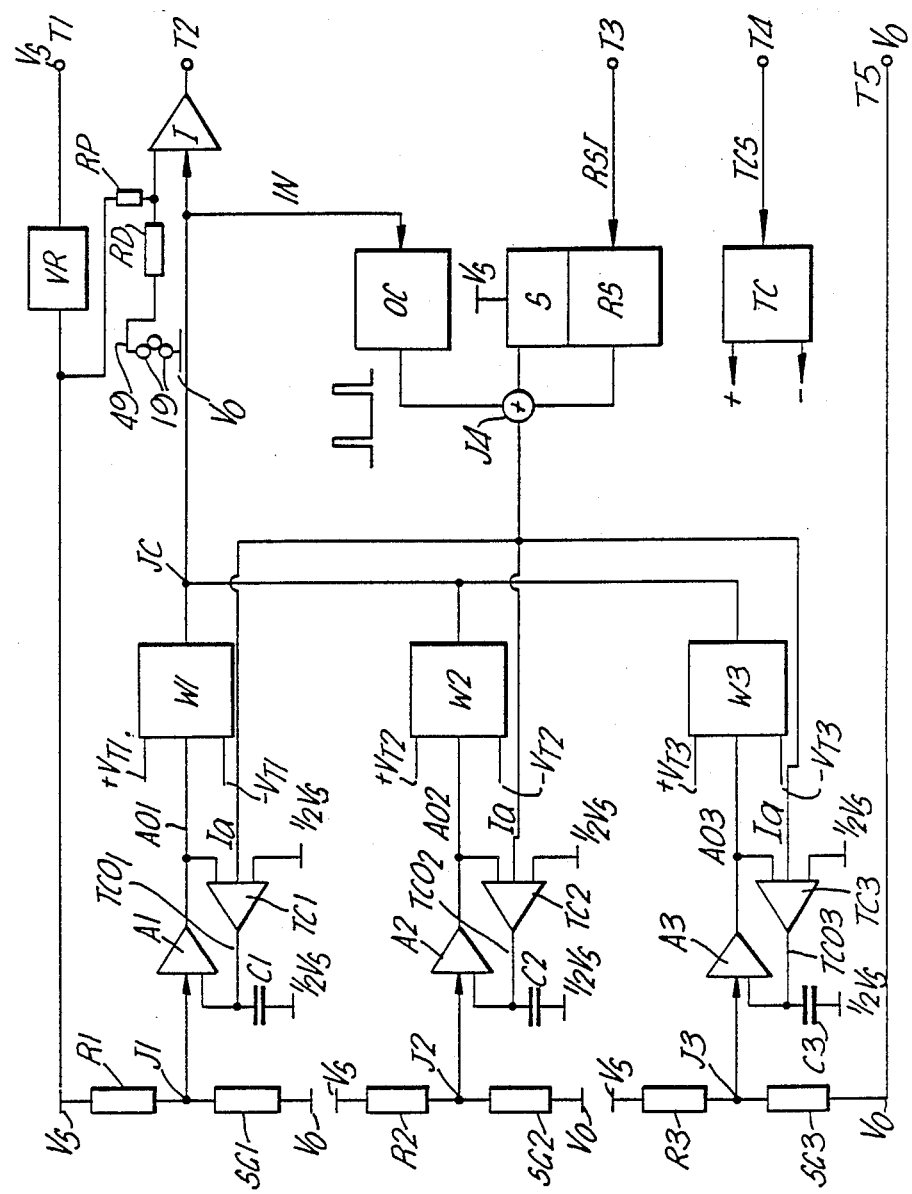
FIG. 4 is a circuit diagram of the electronic elements of the probe signalling system.

Details of the electronic circuit 50 will now be described with reference to FIG. 4. The three strain gauges SG1, SG2 and SG3 are connected with resistors R1, R2 and R3 between a supply voltage Vs which originates from a DC source VDC and a reference voltage Vo connected respectively to the interface unit IF at terminals T1 and T5. The supply voltage is regulated to a constant value by voltage regulator VR. The value of each resistor is arranged to be the same as the nominal resistance of each strain gauge so that the nominal voltages at junctions J1, J2 and J3 between the resistors and the strain gauges is 0.5 Vs. Any change in the resistance of the strain gauges causes variations of the voltage at the three junctions and these variations are amplified in amplifiers A1, A2 and A3 which provide outputs A01, A02 and A03 which are passed to window comparators W1 W2 and W3 which provide the trigger signal from the probe to the machine. In order to avoid false triggering signals due to variations in the resistance of the strain gauges from their nominal value, due to tolerances in manufacturing specification or drift due to atmospheric conditions, an auto-zeroing circuit is provided which biasses the output of each of the amplifiers to 0.5 Vs. The operation of the auto-zeroing circuit is described with reference to one only of the amplifiers e.g. A1. For the purposes of this description 0.5 Vs is taken to be zero.

The voltage output A01 of the amplifier A1 is connected as one of the voltage inputs of a transconductance amplifier TC1, the other voltage input for which is 0.5 Vs.

A current input Ia is also provided for amplifier TC1, and the output TC01 of amplifier TC1, which is a current output, is dependent on the difference between the voltage inputs A01 and 0.5 Vs, and on the current input Ia. The operation of the transconductance amplifier TC1 is such that when either this voltage difference or the current Ia is zero, the output TC01 is zero. Output TC01 is connected both to a potential of 0.5 Vs through a capacitor C1, and to one of the inputs of amplifier A1.

A high impedance is provided at the input of amplifier A1 so that the current output TC01 flows into the capacitor C1 changing its potential and providing a voltage input at amplifier A1. It will be seen that while the output from amplifier A1 remains at zero the output TC01 from the amplifier TC1 will be zero, but any change in the resistance of the strain gauge will cause a change in voltage at junction J1 which will produce an output A01 from amplifier A1. This in turn causes an output from amplifier TC1 which produces a correcting voltage input to amplifier A1 from capacitor C1 which is arranged to be such as to bias the output of amplifier A1 to zero.

Similar components being referenced by the same letters with suffices 2 and 3 make up auto-zeroing circuits for strain gauges SG2 and SG3 respectively and these circuits are not described in detail. Once the outputs from amplifiers A1, A2 and A3 have been stabilized, any change, in any direction, of any one of the strain gauge outputs causes a change in the respective amplifier output. This change, if greater than the threshold values of the window capacitors W1, W2 and W3 which are nominally set at $+100$ mV and $-100$ mV, will cause the window comparators to switch from logic high to logic low regardless of whether the change in amplifier output was positive or negative. Any one of the comparators going "low" will make the juntion JC where the outputs of all of the comparators are interconnected go "low". The "low" signal is passed through an inverter I to provide a conventional logic "high" output from the electronic circuit as the "probe triggered" signal which is coupled to terminal T2.

When the probe is switched on it is desirable that the auto-zero circuits work relatively rapidly to stabilize the outputs of amplifiers A1, A2 and A3, but it is important that during probing, the signals from the amplifiers are not nullified by the auto-zero circuit before they reach the threshold level required to trigger the window comparators. The speed of operation of the auto-zero circuit must therefore be variable and this is achieved by varying the current Ia from a high level to a low level.

For the high speed mode of operation a start-up circuit S provides a steady high level d.c. current for about 3 seconds causing a high current input Ia to each of the transconductance amplifiers. Thus while there is an output from any of the amplifiers A1, A2 or A3, the outputs of the respective amplifiers TC1, TC2 or TC3 will be high causing a rapid charging of capacitors C1 C2 or C3 to provide voltage inputs to the amplifiers A1, A2 or A3 to nullify any inputs from the junction J1, J2 and J3. After the three second interval the start up circuit is cut out automatically.

For low speed operation the current Ia is provided from an oscillator circuit OC. This circuit may be of any known type which is capable of providing d.c. current pulses at a high mark space ratio, such as to reduce the average current level Ia by about 550:1. The oscillator output is fed to a summing junction J4. Thus the auto-zeroing current input is only available in short pulses between which, the outputs from the transconductance amplifiers are zero. The capacitors thus receive current in short-bursts when there is an output from amplifiers A1, A2 and A3 and the rate of charging of the capacitors is greatly reduced. The reduction is aimed to give a low rate of auto-zeroing which is about one tenth of the speed at which the strain gauge outputs change during probing.

The advantage of this method of reducing the current Ia is that it avoids the need for high value resistors which would be needed to produce a low current Ia from the d.c voltage Vs. The low average current produced by the oscillator allows the use of small low value capacitors while providing a low average current.

After the probe has been triggered the autozero circuits are inhibited to prevent them from reducing the outputs of amplifiers A1, A2 and A3 to a value below the threshold values of the window comparators while the stylus is deflected. This would give a false indication to the machine that the movable structure had returned to its rest position, and would provide a false trigger signal when the stylus is dis-engaged from the workpiece and the movable member returns to its rest position. To inhibit the autozero circuit a connection IN is made from junction JC to provide a signal to the oscillator circuit OC to inhibit its operation when a trigger signal is produced by the window comparators. When the movable structure of the probe returns to its rest position and the window comparator outputs change state from low back to high, the change in output signal automatically releases the inhibit signal.

An external re-set capability is required once the inhibit signal has been initiated in case the probe is left for too long with its stylus in the deflected position. In this situation the charge may leak away from the capacitors C1, C2 or C3 changing the voltage input to the respective amplifiers A1, A2 and A3 so that when the probe is pulled away from the workpiece and the stylus returns to its rest position the circuit may continue to indicate a triggered condition. Thus, a re-set circuit RS is provided so that whenever the probe has been deflected for more than 10 seconds the re-set circuit may be activated by a signal RS1 to re-introduce the high level d.c current Ia to activate the fast autozeroing condition.

One other addition to the circuit 50 is a threshold control circuit TC for the window comparators, which enables them to be switched from high gain to low gain when the probe is being moved rapidly between operations to avoid surges through the circuit due to shock loads on the probe. This circuit along with circuit s is activated by a signal TCS from the interface unit.

The optional circuit 49 may be included to provide the additional stylus displacement signal at terminal T2.

The circuit 49 is connected at one end to reference voltage Vo and at the other end to the inverter I via resistor RD. A pull-up resistor RP is connected between resistor RD and the supply voltage Vs. The value of resistor RD is chosen to provide a new reference voltage to the inverter of ½ V when the circuit 49 is included. When the stylus is displaced and the circuit 49 goes open circuit, the pull-up resistor RP pull the inverter reference voltage up to Vs to provide the signal for the machine.

In one embodiment of the invention operation of the re-set circuit RS and the threshold control circuit TC is achieved from control circuits of the machine or interface unit (not shown but know per se). These circuits operate conventionally at a voltage less than the supply voltage Vs and require separate external connections to be made to the probe at terminals T3 and T4. All communications between the probe and the machine or interface to take place using only two external connections to the probe. In this way the probe can be made to be interchangeable with conventional probes.

Figure 5:
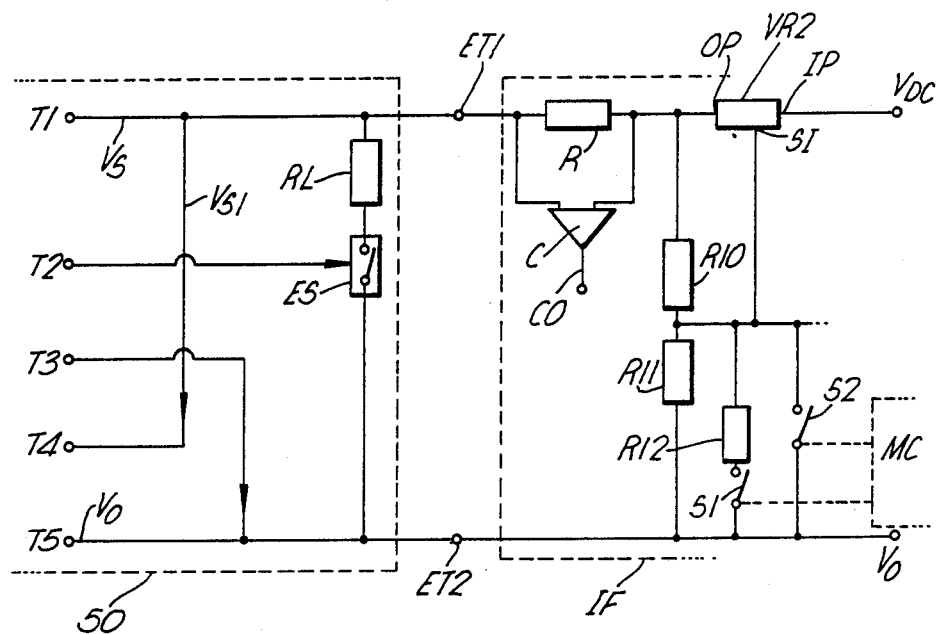
FIG. 5 is a circuit diagram showing the connections between the probe and an interface unit on a machine.

In order to achieve this the connections between the probe and the interface unit are modified as shown in FIG. 5 in which it can be seen that the terminal T1 is connected directly to a terminal ET1 and terminal T5 is connected to a terminal ET2. ET1 and ET2 form only two external terminals on the probe to which supply and return connections are made to the interface. The probe-triggered signal from terminal T2 is connected through an electronic switch unit ES and load resistor RL to terminal ET1. Terminal T3 is connected to the reference voltage line Vo at terminal ET2, thus effectively incapacitating the re-set circuit, and the terminal T4 is connected to the supply upstream of terminal T1, i.e. upstream of the voltage regulator VR.

By this means all of the two-way communication between the probe and the interface unit is achieved as follows:

With the supply voltage at its nominal level Vs the probe is arranged to be in high gain mode and a 'quiescent' current Iq flows around the probe and to the interface unit. When the probe is triggered the signal activates electronic switch ES which causes a further current to flow through the load resistor RL. This increased current is detected in the interface unit as an increase in voltage across a low value resistor R in series with the supply. A comparator C in parallel with resistor R detects the increase and produces and output CO which is suitably conditioned in the interface for receipt by the machine to stop the machine and take the measurement readings. When the probe stylus returns to the rest position the switch ES is de-activated and the current flow returns to Iq.

When a change in gain is required at the window comparators the voltage from the supply is increased by a nominal 3 volts to Vs1 to provide signal TCS at terminal T4 to activate the threshold control TC. Because terminal T4 is connected to the supply upstream of the voltage regulator VR, the circuit downstream of VR is not affected since regulator VR maintains a constant voltage Vs into the probe circuit and the quiescent current Iq is not affected.

To obtain a re-set action the supply voltage is reduced to near zero for a short period and then returned to the level of Vs or the higher Vs 1. This activates the start-up circuit S which provides the re-set action.

One electrical circuit for achieving the changes in voltages is shown at the right hand side of FIG. 5 in which a further voltage regulator VR2 having first input I/P and an output of O/P is connected between resistor R and the source VDC. The regulator is of conventional construction e.g. as sold under the designation LM317 and is pre-programmed to provide the three voltage levels required depending on the change of state of switches S1 and S2 which vary the voltage applied to the sensing input SI of the regulator. The switches are opened or closed under the control of the machine control computer MC which determines the need for a voltage change under any given circumstances of operation of the machine. The components referenced R10, R11 and R12 are resistors which complete the circuit.

We claim:
1. A probe for measuring workpieces comprising:
a body having an axis;
a fixed structure contained within and distinct from the body;
means connecting said fixed structure to the body;
a movable structure at least partially contained within the body and including a stylus holder to which one or more workpiece-contacting styli are connectable;

support means for supporting the movable structure in a rest position on said fixed structure, said support means comprising a plate portion of said fixed structure which is centered about said axis, said plate portion overlying at least a portion of said means connecting said fixed structure to the body in a direction transverse to said axis;

bias means for urging the movable structure into the rest position from which it is displaceable in opposition to the bias means when a stylus contacts a workpiece and a displacing force is thereby produced on the stylus, the bias means acting to restore the movable structure to the rest position when the displacing force ceases;

sensing means for sensing said stylus contact with the workpiece and for providing an electrical signal indicative thereof;

and wherein the bias means acts between the movable structure and the fixed structure, the bias means being biased against a surface of said fixed structure extending transverse to said axis and spaced from said movable member along said axis in a direction away from the stylus holder, and the means connecting the fixed structure to the body includes the sensing means, whereby the forces produced by the bias means are not reacted through the sensing means.

2. A probe according to claim 1, wherein said surface is supported by at least one support member extending in the directions of said axis and connected at opposite ends to said surface and a portion of said fixed structure protruding transverse to said axis, respectively.

3. A probe according to claim 1, wherein said surface is a triangular plate.

4. A probe according to claim 1, wherein the means connecting said fixed structure to said body includes at least a portion which extends in the directions of said axis.

* * * * *